April 2, 1957          E. MEYER          2,787,164
PROGRESSIVELY ADJUSTABLE FRICTION GEARS
Filed March 9, 1954          2 Sheets-Sheet 1
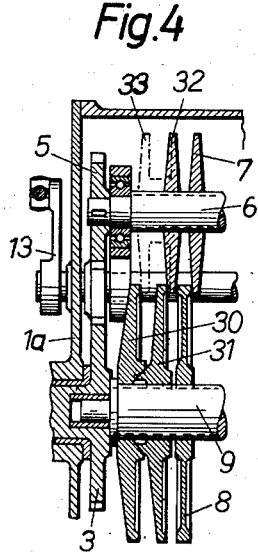
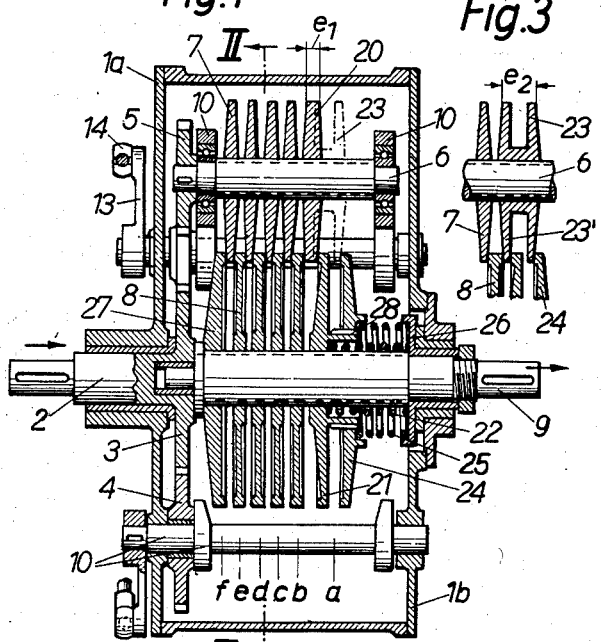
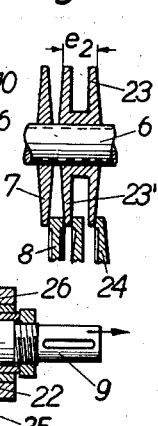
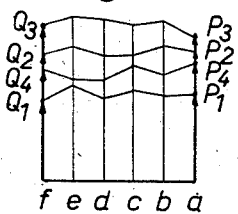
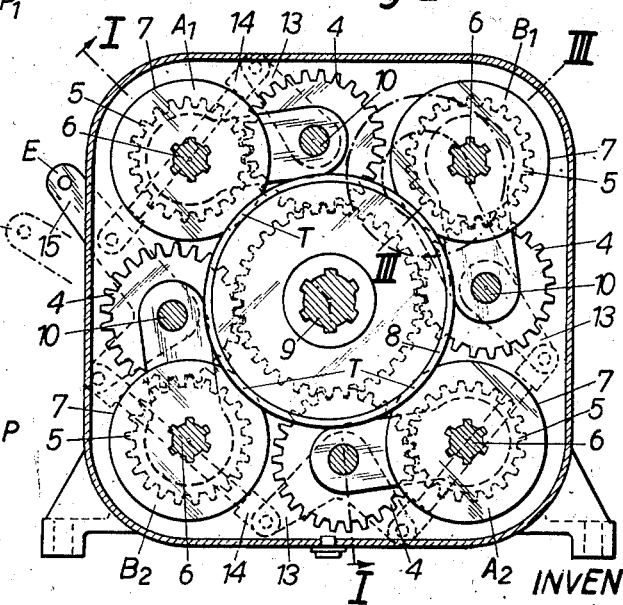
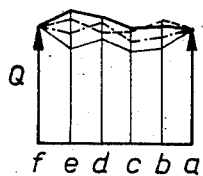
INVENTOR:
ERNST MEYER

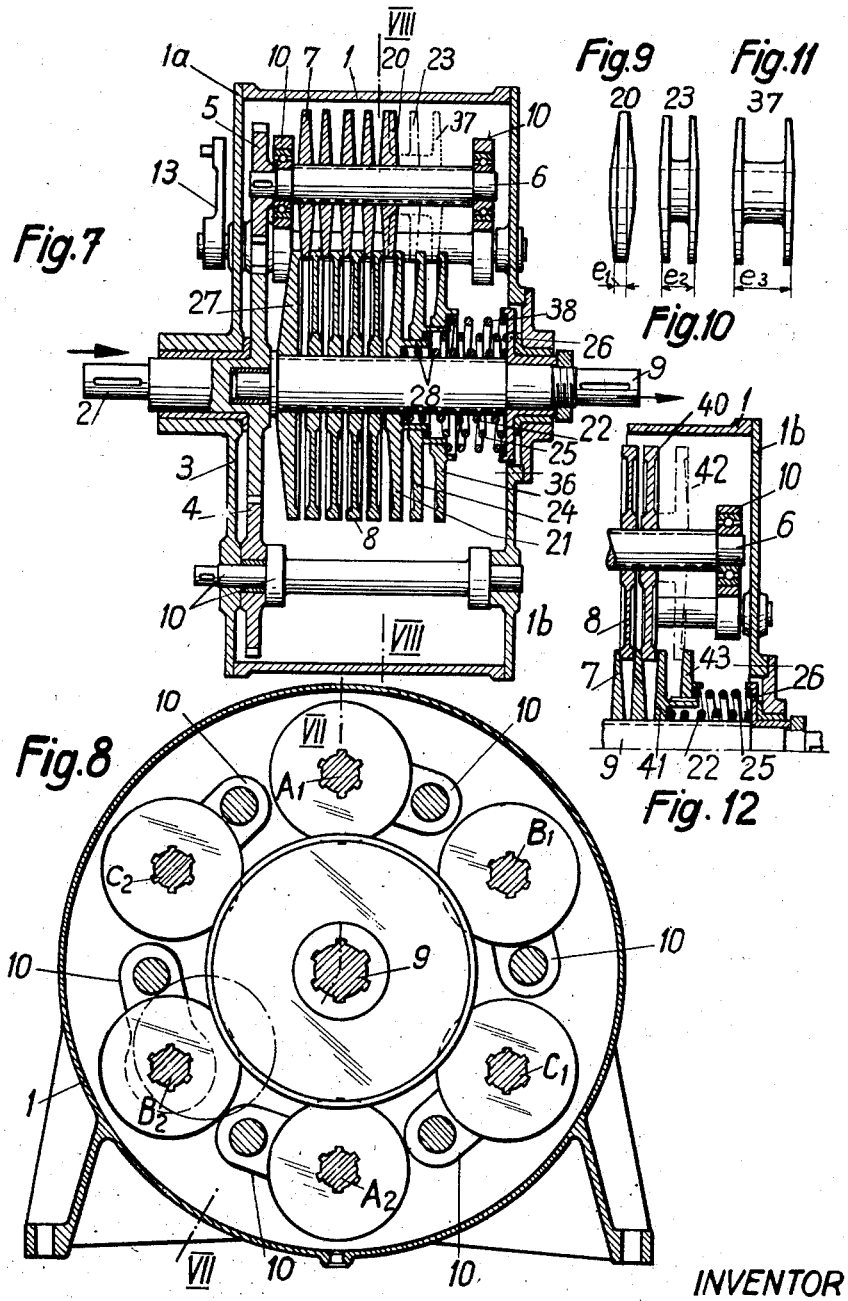

United States Patent Office 2,787,164
Patented Apr. 2, 1957

2,787,164

PROGRESSIVELY ADJUSTABLE FRICTION GEARS

Ernst Meyer, Winterthur, Switzerland, assignor to Schweizerische Lokomotiv- und Maschinenfabrik, Winterthur, Switzerland Application March 9, 1954, Serial No. 415,119

Claims priority, application Switzerland March 27, 1953

8 Claims. (Cl. 74—199)

This invention relates to progressively adjustable friction gears having two types of interengaging friction discs, namely plate discs and discs provided with a beaded marginal edge, and having a central shaft carrying axially slidable friction discs of one of the said types rotating with the shaft and capable of being axially loaded, and at least four travelling counter shafts adapted to approach the central shaft and to recede therefrom for varying the gear ratio, and carrying axially slidable friction discs of the second type rotating with the shaft.

In gears of the above mentioned type which comprise more than three travelling outer shafts, it is difficult to obtain a uniform distribution of the pressure to be applied to all the series of discs on the counter shafts, for the reason that supporting the central end-disc on four or more series of discs is statically undetermined. Already small differences in the thickness of the single friction discs and particularly the total dimension of the different series of friction discs on the feed shafts can produce considerable pressure differences.

In order to overcome this difficulty it has already been proposed to make one of the central end-discs as resiliently yieldable as possible, that is to say thin-walled; this, however, is contrary to the requirements to build this disc sufficiently resistant for transmitting the high contact pressures.

It is an object of the invention to more evenly balance the axial pressures exerted on the ends of the different series of friction discs, than it was possible hitherto with conventional balancing mechanism. This is attained by applying statically determined supporting methods.

According to the invention the series of friction discs of the feed shafts are divided in systems of two or three groups of discs equiangularly disposed along a circle. Each of these systems comprise, at least at one end of the central disc series, axial pressure means bearing uniformly against the corresponding two or three friction disc groups on the counter shafts, and one special friction disc disposed at the corresponding end of the friction disc series on the counter shaft and receiving only the pressure of the corresponding central friction disc.

Several embodiments of the invention are illustrated by way of example in the accompanying drawings, in which, Fig. 1 is a longitudinal axial section through a friction gear according to the invention, taken along the line I—I of Fig. 2;

Fig. 2 is a transverse section along the line II—II of Fig. 1;

Fig. 3 is a fragmentary longitudinal section along the line III—III of Fig. 2;

Fig. 4 is a fragmentary longitudinal section, similar to Fig. 1, of a modification;

Fig. 5 represents a first diagram of forces;

Fig. 6 represents a second diagram of forces;

Fig. 7 is a second modification shown in longitudinal section according to the line VII—VII of Fig. 8;

Fig. 8 is a transverse section of this modification according to the line VIII—VIII of Fig. 7;

Figs. 9, 10 and 11 are views in elevation of end friction discs of three counter shafts;

Fig. 12 is a further modification, shown in a fragmentary longitudinal section.

Referring to Figs. 1 to 4, a friction gear mechanism is lodged in a casing 1 and comprises four counter shafts 6. The torque is transmitted from the driving shaft 2, carried in a bearing on the left hand cover 1a of the casing, by gear wheels 3, 4 and 5 to the four counter shafts 6, and by means of a second adjustable transmission stage comprising flat conical discs 7 and beaded edge discs 8 to the driven, also centrally located output shaft 9. In order to vary the transmission ratio of this second stage, the grooved counter shafts 6, carrying longitudinally slidable flat discs 7 turning with the shafts, are journalled in rocking forks 10 pivotally mounted in the casing covers 1a and 1b and coupled with each other by means of rocking levers 13 and connecting rods 14. The central shaft 9 is also grooved and carries longitudinally slidable beaded edge discs 8 remaining continuously engaged between the flat discs 7.

The relative position of the counter shafts 6 and the central shaft 9 as shown in Figs. 1 to 4 corresponds to the final step (position E) of the control lever 15 (Fig. 2) of the gear, in which the gear ratio is the smallest, and thus the speed of the driven shaft 9 the greatest when the input speed is constant. The initial stage of the gear is obtained at the position O of the control lever 15. The corresponding position of the discs on the counter shaft is shown in dash and dot lines for the upper right hand disc series in Fig. 2.

For transmission of the axial load the friction disc transmission stage is divided in two systems having each two diametrically opposed series of travelling counter discs and a corresponding central load applying member. The first system comprises the two opposite series $A_1$ and $A_2$ of counter discs including two primary discs 20, a pressure applying disc 21 on the central shaft 9, and the coiled spring 22, the second system comprises two opposite series $B_1$ and $B_2$ of counter discs including each a primary friction disc 23 shown in Fig. 3 and in dash and dot lines in Fig. 1, and the central pressure applying disc 24 and coiled spring 25. Both springs 22 and 25 are bearing with their rearward end against a disc 26 secured to the shaft 9. The total axial thickness $e_2$ of the primary discs 23 of the second system is larger than the thickness $e_1$ of the primary discs 20 of first system. Both discs 23 are circumferentially recessed so as to be of H-shaped cross section, and the inner disc section 23' is thinner than the disc 20. For this reason, the pressure of the spring 22 on the disc 21 is transmitted exclusively on the first pair $A_1$, $A_2$ of the series of counter discs 20, and the pressure of the spring 25 is transmitted exclusively on the second pair $B_1$, $B_2$ of the series of counter discs, including the discs 23, the two series of each pair always receiving an equal portion of the pressure exerted by the corresponding central discs 21 and 24, respectively. The supporting pressure exerted by the primary central pressure discs on the series of friction discs accordingly is statically determined. It is obvious that the two springs 22 and 25 can be balanced by any conventional adjusting means not shown in the drawing to exert equal pressures. In any case, the two springs are so dimensioned that they have identical characteristics, so that upon changing the gear ratio resulting in a corresponding axial displacement of the pressure discs 21 and 24, the increase or decrease of spring pressure is equal for both springs.

As shown in Fig. 1, the pressure disc 21 is provided with a hub sleeve 28 receiving internally the end of spring 22, while the external face of the sleeve is fluted and slidably carries the pressure disc 24 turning with the sleeve.

While the input pressures are completely balanced by means of the described structure, certain pressure differences may build up within the various series of discs, since practically the plate discs 7 will never be of rigorously identical thickness. If the beaded edge discs 8 mounted on the central shaft 9 would be fully elastic, such small differences in thickness could be compensated by yielding or bending between the joints T (Fig. 2) where pressure is applied. Since such compensation is obtained only to a certain extent the pressures acting on the counter-pressure disc will generally not be fully equilibrated.

In order, however, to obtain a complete balance of pressures on the counter-pressure end of the series of discs, modification of the manner of supporting the series of discs may be used as illustrated in Fig. 4. In this modification, instead of a simple counter-pressure disc 27, there are provided two discs 30 and 31, and the end friction discs 32 and 33 of the series $A_1$, $A_2$ and $B_1$, $B_2$ of the travelling friction discs are formed with different cross sections, in the same manner as the input discs 20 and 23. The disc 33 having H-shaped cross section is shown in dash and dot lines in Fig. 4. Moreover, since the pressure disc 31 abuts against the hub of the disc 30 by the intermediary of a spherical surface, each of the two systems has its own counter-support and a complete balance of pressures is obtained at least with respect to the two systems.

For illustrating these pressure conditions, they shall be referred to the diagrams according to Figs. 5 and 6. The input pressures exerted by the springs 22 and 25 are designated by $P_1$ and $P_4$, and the counter-pressures by $Q_1$ and $Q_4$. The first diagram, Fig. 5, corresponds to a conventional gear having four outer travelling shafts, and comprising at both ends of the central disc series a rigid or semi-rigid pressure disc. In this case neither the input pressures, nor the output pressures are balanced, because the manner of bearing of the pressure discs on the series of the friction discs on the travelling shafts is statically undetermined.

The diagram of Fig. 6 corresponds to the arrangement according to Figs. 1 to 3 and the modification of Fig. 4. The input pressures as well as the output pressures are balanced, as it results from the above description. In this case the following equations are obtained:

$$P_1=P_2=P_3=P_4=P \text{ and } Q_1=Q_2=Q_3=Q_4=Q=P$$

As mentioned above, also in the gears according to the invention small pressure differences may result within the several series of discs owing to slight deviations in thickness of the single discs; a supposed course of the pressures has been illustrated in Fig. 6 by the four broken lines between the points of the pressures P and Q. For the reason of distinctness the deviations of the pressure lines have been shown somewhat exaggerated.

In the second example of the invention according to Figs. 7 to 11, the friction gear illustrated is of similar design as the gear according to Figs. 1 to 3, but it comprises six travelling outer shafts. These latter are subdivided into three systems of two diametrically opposed shaft pairs $A_1$, $A_2$; $B_1$, $B_2$; $C_1$, $C_2$; having end friction discs 20, 23 and 37, and corresponding pressure discs 21, 24 and 36. In order to simplify the illustration, the end friction disc 23 of the shaft pairs $B_1$, $B_2$ are shown in dash and dot lines, and the end friction disc 37 of the pairs $C_1$, $C_2$ are shown in dotted lines in Fig. 7. The discs 23 and 37 have H-shaped cross sections, so that the pressure discs 21 and 24 may penetrate between the two disc flanges. Since a particular pressure spring 38 is provided for the third system, which spring has the same characteristics as the two first springs 22 and 25, also in this example at least the input pressures are completely balanced.

On the counter-pressure side, the pressure forces can be taken up as illustrated by a simple end disc 27, or by three different discs bearing one against the other by a spherical surface as shown in Fig. 4.

Instead of dividing the gear having six counter shafts in three systems of two shafts each, it could be divided in two systems having each three counter shafts and corresponding auxiliary members, the result of the complete balance of pressure forces being conserved, since supporting the end pressure discs on three series of discs is statically determined. In this case, the three shafts of one system would be angularly displaced through 120°, and the two systems themselves would be angularly displaced through 60°.

In the arrangement illustrated in Fig. 12, the plate discs 7 are not carried by the travelling shafts 6, but by the central shaft 9, and the beaded edge discs 8 are carried by the travelling shafts 6 instead of by the central shaft. The end discs 40, 41, 42 and 43, as illustrated, may be formed as special members as described in the previous examples.

What I claim is:

1. A progressively adjustable friction gear, comprising two types of interengaging friction discs, including flat conical discs and beaded edge discs, a central shaft carrying a series of axially slidable friction discs of said one type rotating with said shaft and adapted to be axially loaded, at least four travelling counter shafts disposed along a circle around said central shaft, said counter shafts carrying each a series of friction discs of said other type, each series rotating with the corresponding counter shaft and axially slidable thereon, the series of friction discs on said counter shafts being in interengaging relation with the series of friction discs on said central shaft, control means carrying said counter shafts and movable to approach the counter shafts and recede them from said central shaft for varying the gear ratio, the series of friction discs on said counter shafts being divided into systems having a plurality of group of discs equiangularly disposed along said circle, each system comprising at least at one end of the friction disc series on the central shaft, axial pressure means including a pressure member bearing uniformly on its corresponding friction disc groups on the counter shafts, and at least at one end of each friction disc series on the counter shafts, a special friction disc receiving only the pressure of the corresponding pressure member at one end of the central disc series, for the purpose of equalizing the axial pressures exerted on the various series of friction discs.

2. A friction gear as defined in claim 1, wherein said axial pressure means of each of said systems of friction discs includes a spring member.

3. A friction gear as defined in claim 1, wherein the series of friction discs on said central shaft comprises for each of said systems of friction discs a pressure disc, the various pressure discs bearing on each other by means of spherical surfaces.

4. A friction gear as claimed in claim 1, wherein said special friction discs for the various systems are of different total axial thickness, corresponding special friction discs in each group belonging to the same system being of equal thickness.

5. A friction gear as claimed in claim 1, wherein said special friction discs corresponding to the second and further systems of a plurality of systems are of H-shaped cross section, the special friction discs of said various systems being of different total axial thickness, and corresponding special friction discs in each group belonging to the same system being of equal thickness, whereby corresponding interengaging friction discs on said central shaft may penetrate into the free marginal space formed in said H-shaped discs.

6. A friction gear as claimed in claim 1, wherein said axial pressure means at the end of the friction disc series on said central shaft include for each of said systems one end disc, all but the last of the various end discs being provided with a sleeve hub receiving one end of an axial pressure exerting spring, the external face of each sleeve hub carrying the next following end disc, mounted thereon to be axially slidable but turning with the hub.

7. A friction gear as claimed in claim 6, wherein a supporting disc is arranged on said central shaft, all of said pressure exerting springs bearing with their other ends against said supporting disc.

8. A friction gear as claimed in claim 7, wherein said pressure exerting springs have identical characteristics in order to provide for equal variation of spring pressure upon corresponding axial displacement of the pressure discs.

References Cited in the file of this patent

UNITED STATES PATENTS

| | | |
|---|---|---|
| 643,130 | Heermans | Feb. 13, 1900 |
| 1,963,599 | Tscherne | June 19, 1934 |
| 2,216,642 | Davis | Oct. 1, 1940 |
| 2,623,396 | Beier | Dec. 30, 1952 |